US007508909B2

(12) United States Patent
Harmon et al.

(10) Patent No.: US 7,508,909 B2
(45) Date of Patent: Mar. 24, 2009

(54) APPARATUS AND METHOD FOR INSPECTING A SEALED CONTAINER

(75) Inventors: J. Frank Harmon, Pocatello, ID (US);
James L. Jones, Idaho Falls, ID (US);
Alan W. Hunt, Pocatello, ID (US);
Randy J. Spaulding, Pocatello, ID (US);
Michael Smith, Phoenix, AZ (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 298 days.

(21) Appl. No.: 11/379,888

(22) Filed: Apr. 24, 2006

(65) Prior Publication Data
US 2007/0245809 A1 Oct. 25, 2007

(51) Int. Cl.
*G01N 23/04* (2006.01)
(52) U.S. Cl. .......................................... 378/57; 378/196
(58) Field of Classification Search .................... 378/57, 378/98.8, 195, 196, 197, 208
See application file for complete search history.

(56) References Cited

U.S. PATENT DOCUMENTS

| | | | |
|---|---|---|---|
| 3,787,697 A | 1/1974 | Shields | |
| 4,068,306 A * | 1/1978 | Chen et al. | 378/901 |
| 4,389,568 A | 6/1983 | Dowdy et al. | |
| 4,523,186 A | 6/1985 | Fiarman | |
| 4,606,004 A * | 8/1986 | Crawford et al. | 378/901 |
| 4,953,192 A * | 8/1990 | Plewes | 378/146 |
| 4,962,315 A | 10/1990 | Kawasaki et al. | |
| 5,638,420 A * | 6/1997 | Armistead | 378/57 |
| 5,661,768 A | 8/1997 | Gilligan, III et al. | |
| 5,665,970 A * | 9/1997 | Kronenberg et al. | 250/370.01 |
| 5,754,617 A * | 5/1998 | Itoh | 378/57 |
| 6,002,501 A | 12/1999 | Smith et al. | |
| 6,457,858 B1 * | 10/2002 | Nakamura et al. | 378/196 |
| 6,480,563 B2 * | 11/2002 | Hoffman et al. | 378/19 |
| 6,624,425 B2 | 9/2003 | Nisius et al. | |
| 6,633,625 B2 * | 10/2003 | Jackson et al. | 378/54 |
| 7,054,408 B2 * | 5/2006 | Jiang et al. | 378/19 |
| 2003/0034456 A1 * | 2/2003 | McGregor | 250/370.09 |
| 2004/0109532 A1 * | 6/2004 | Ford et al. | 378/57 |
| 2005/0157844 A1 * | 7/2005 | Bernardi et al. | 378/57 |
| 2006/0008047 A1 * | 1/2006 | Zhou et al. | 378/10 |
| 2008/0123808 A1 | 5/2008 | Caffrey | |

OTHER PUBLICATIONS

Ziock, Klaus-Peter, et al., Radiation Imaging of Dry-Storage Casks for Spent Nuclear Fuel, 2005 IEEE Nuclear Science Symposium Conference Record, pp. 1163-1167.

* cited by examiner

*Primary Examiner*—Chih-Cheng G Kao
(74) *Attorney, Agent, or Firm*—Trask Britt

(57) ABSTRACT

An apparatus for inspecting a sealed container is disclosed and which includes a pulsed electron accelerator which is positioned in spaced relation relative to a first side of the sealed container, and which produces a pulsed beam of photons which passes through the sealed container and any contents enclosed within the sealed container; a detector positioned in spaced relation relative to a second, opposite side of the sealed container, and which receives the pulsed beam of photons which passes through the contents of the sealed container, and which produces an output signal; and a computer for developing a visible image from the output signal of the detector which depicts the contents of the sealed container.

37 Claims, 6 Drawing Sheets

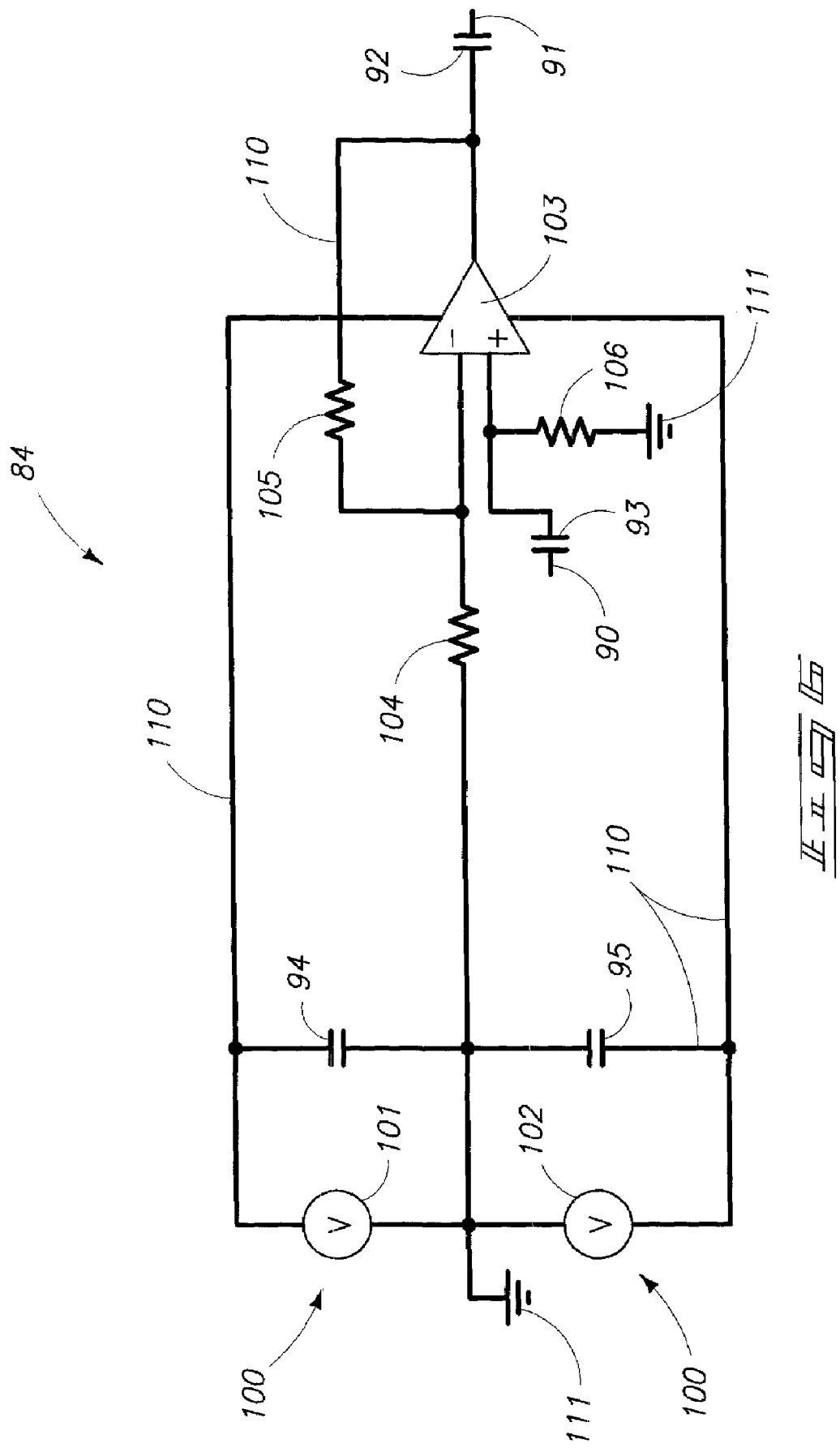

APPARATUS AND METHOD FOR INSPECTING A SEALED CONTAINER

GOVERNMENT RIGHTS

The United States Government has certain rights in this invention pursuant to Contract No. DE-AC07-051D 14517 between the United States Department of Energy and Battelle Energy Alliance, LLC.

CROSS-REFERENCE TO RELATED APPLICATIONS

This application is related to application Ser. No. 11/535,084, filed Sep. 26, 2006, entitled "A DETECTOR AND METHOD FOR INSPECTING A SEALED NUCLEAR STORAGE CONTAINER," pending.

TECHNICAL FIELD

The present invention relates to an apparatus and method for inspecting a sealed container and more specifically to an apparatus and method which is useful for inspecting large sealed containers and the contents thereof.

BACKGROUND OF THE INVENTION

Various methods and devices have been proposed for inspecting sealed containers for purposes of identifying contraband and other potentially harmful materials which may be used for terrorism or for other unlawful activities. At ports of entry to the United States, massive amounts of cargo are often unloaded, and thereafter inspected for Customs or other regulatory purposes. This inspection process is not without its shortcomings. It is well known that contraband has often slipped passed inspectors and other government agents by being positioned or otherwise concealed within larger storage containers where detection of the contraband or unlawful substances may be difficult to uncover using conventional means. In addition to the foregoing, some potentially harmful nuclear materials, which could be utilized in an explosive device could be enclosed in a relatively small region of a large storage container. Detection and identifying concealed high density material such as nuclear material, therefore, is a priority at ports of entry within the United States.

An apparatus and method for inspecting a sealed container which avoids the shortcomings attendant with the prior art devices and practices utilized heretofore is therefore the subject matter of the present application.

SUMMARY OF THE INVENTION

A first aspect of the present invention relates to an apparatus for inspecting a sealed container which includes a pulsed electron accelerator which is positioned in spaced relation relative to a first side of the sealed container, and which produces a pulsed beam of photons which passes through the sealed container and any contents enclosed within the sealed container; a detector positioned in spaced relation relative to a second, opposite side of the sealed container, and which receives the pulsed beam of photons which passes through the contents of the sealed container, and which produces an output signal; and means for developing a visible image from the output signal of the detector which depicts the contents of the sealed container.

Another aspect of the present invention relates to an apparatus for inspecting a sealed container which includes a pulsed electron accelerator positioned in spaced relation relative to one side of a sealed container, and which has contents to be inspected, and wherein the pulsed electron accelerator, when energized, produces a beam of pulsed bremsstrahlung radiation having an intensity which passes through the sealed container, and which is absorbed, at least in part by the contents of the sealed container; an array of ionization detectors positioned in spaced relation relative to an opposite side of the sealed container, and in substantial receiving alignment relative to the beam of pulsed bremsstrahlung radiation, and wherein each of the ionization detectors produces an output signal which is proportional to the intensity of the beam of bremsstrahlung radiation which has passed though the sealed container and which is received by each of the ionization detectors; a collimator which is operably mounted on each of the ionization detectors, and which collimates, at least in part, a portion of the beam of bremsstrahlung radiation which has passed through the sealed container, and which is received by each of the ionization detectors; a data acquisition assembly disposed in output signal receiving relation relative to the respective proportional output signals generated by each of the ionization detectors which are positioned in the array, and wherein the data acquisition assembly generates a data output regarding the intensity of the beam of bremsstrahlung radiation which has been received by each of the ionization detectors; and a computer disposed in controlling relation relative to the pulsed electron accelerator and which selectively energizes the pulsed electron accelerator to produce the beam of bremsstrahlung radiation, and which further receives the data output of the data acquisition assembly to produce a visible image of the contents of the sealed container.

Still another aspect of the present invention relates to a method for inspecting a sealed container which includes the steps of providing a sealed container which has opposite sides, and which has contents which requires inspection; providing an electron accelerator which, when energized, produces a beam of bremsstrahlung radiation, and positioning the electron accelerator in spaced relation relative to one of the sides of the sealed container, and in an orientation which permits the beam of bremsstrahlung radiation to pass through the container, and the contents enclosed within same; providing a detector of bremsstrahlung radiation, and positioning the detector in spaced relation relative to an opposite side of the sealed container, and in an orientation so as to receive the beam of bremsstrahlung radiation which passes through the sealed container, and the contents thereof, and wherein the detector produces an output signal which is proportional to the intensity of the beam of bremsstrahlung radiation which is received; periodically energizing the electron accelerator to provide a pulsed beam of bremsstrahlung radiation which passes through the sealed container, and the contents thereof, and wherein the beam of bremsstrahlung radiation is absorbed, at least in part, by the contents of the sealed container; converting the output signal of the detector into a stream of data which reflects the intensity of the beam of bremsstrahlung radiation which is received by the detector; and producing a visible image of the contents of the sealed container from the data stream.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 6 is a schematic diagram regarding a preamplifier which finds usefulness in the practice of the present invention.

DETAILED DESCRIPTION OF THE INVENTION

This disclosure of the invention is submitted in furtherance of the constitutional purposes of the U.S. Patent Laws "to promote the progress of science and useful arts" (Article 1, Section 8).

Figure 1:
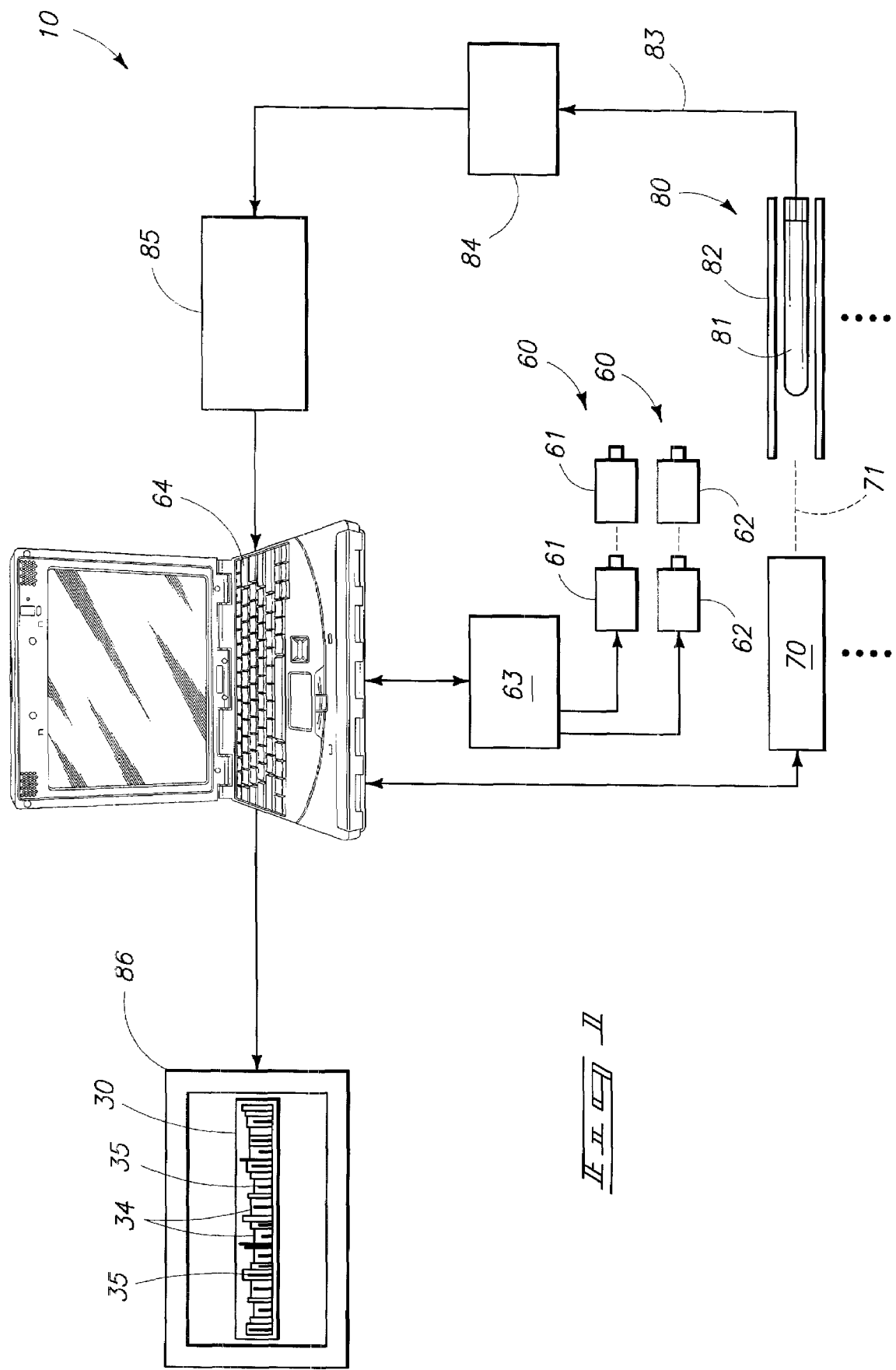
FIG. 1 is a greatly simplified schematic view of the apparatus and method for inspecting a sealed container of the present invention.
Figure 2:
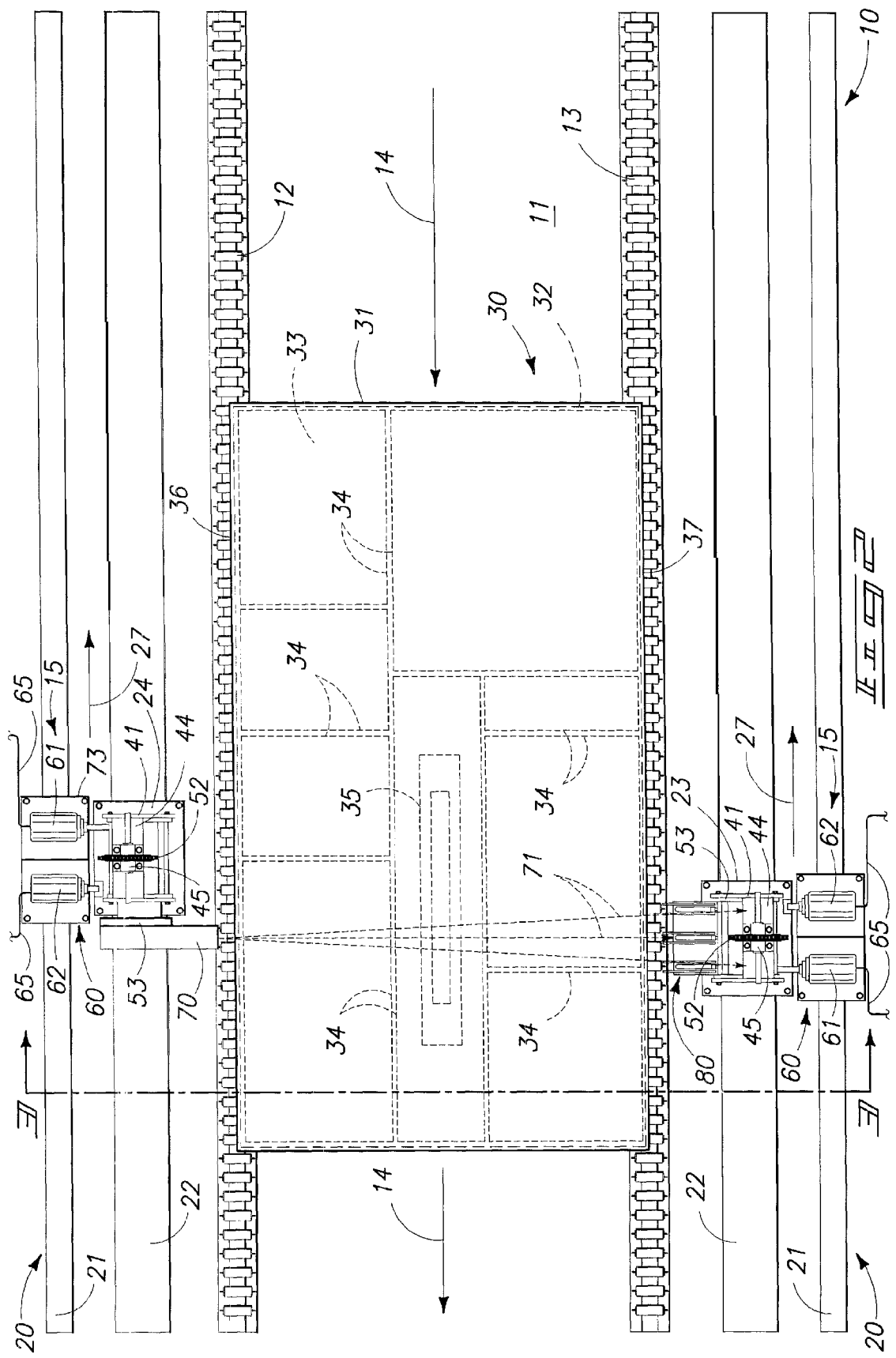
FIG. 2 is a top plan view of one form of the present invention with some underlying surfaces shown in phantom lines to show the structure thereunder.
Figure 3:
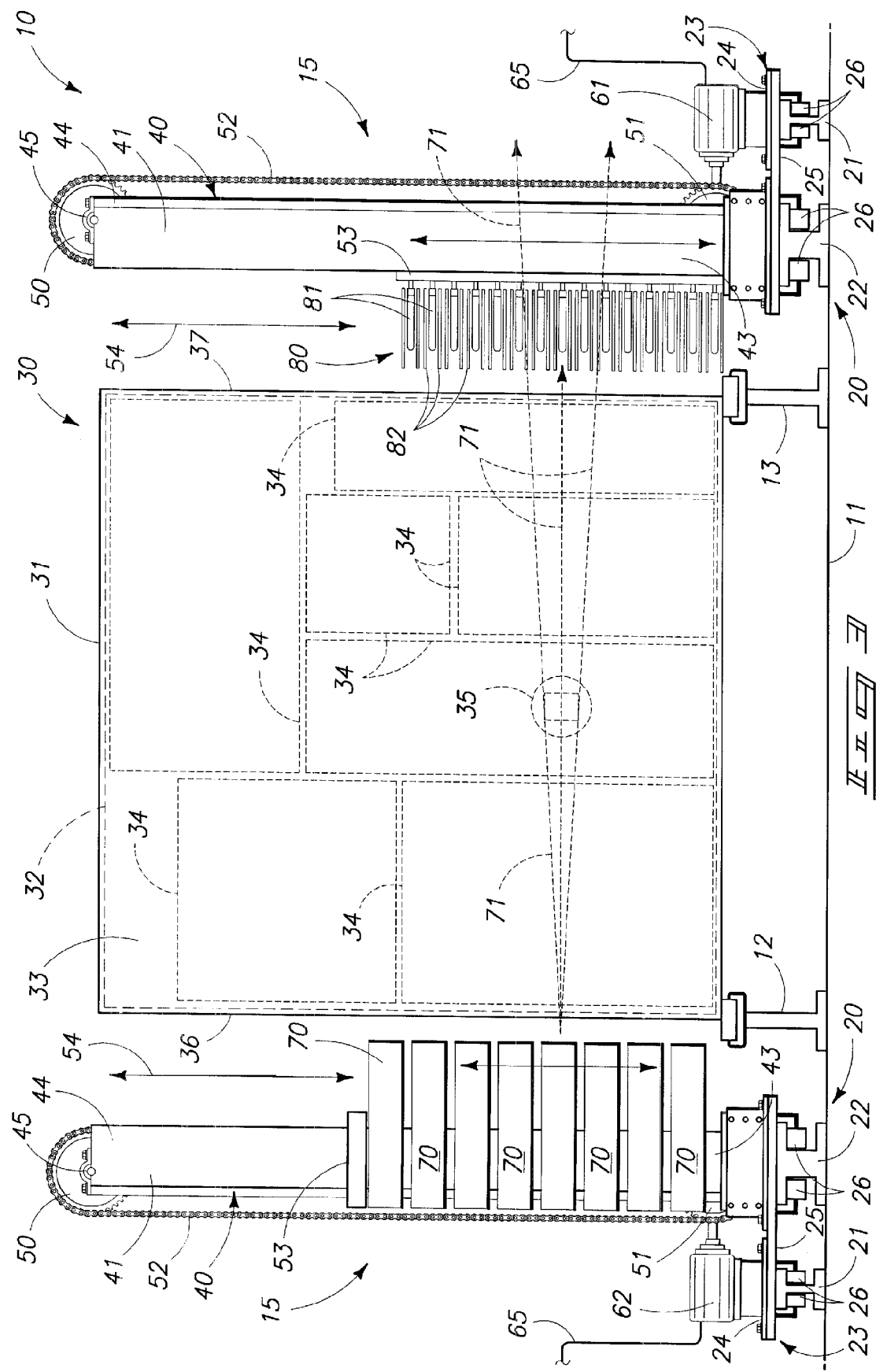
FIG. 3 is a transverse, vertical, sectional view taken from a position along line 3-3 of FIG. 2.

The apparatus and method for inspecting a sealed container of the present invention is generally indicated by the numeral 10 in FIGS. 1 through 3. Referring now to FIGS. 2 and 3, one form of the invention is shown therein, and which can be utilized on a substantially horizontal supporting surface 11. In this regard, the apparatus 10 includes first and second horizontally disposed roller assemblies 12 and 13, respectively, and which rest on the supporting surface 11, and which are further useful for moving a cargo container, which will be discussed below, along a given path of travel 14, and past a pair of inspection stations 15. In addition to the foregoing, individual rail assemblies 20 which are provided, each include first and second rails 21 and 22 which rest on the supporting surface 11, and which movably support a base member 23 in spaced relation relative to the support surface 11. The base member 23 has a top surface 24, and an opposite bottom surface 25. A plurality of rail engaging wheels 26 are mounted on the bottom surface 25, and rollably engage the respective rails 21 and 22 thereby rendering the base member 23 movable along the respective rails 21 and 22, and along a path of travel 27, which is substantially parallel to the path of travel 14 of a sealed container 30, and which is generally indicated by the numeral 30.

As best seen by reference to FIGS. 2 and 3, the apparatus and method 10 of the present invention is useful for inspecting the contents of a sealed container which is generally indicated by the numeral 30. The sealed container 30, in one form of the invention can move along the path of travel 14 past the respective inspection stations 15, or in the alternative, in a second form of the invention, the respective inspection stations 15 are selectively movable, in unison, along the respective rail assemblies 20, and along the path of travel 27 while being employed to inspect the contents of the container 30. As seen in the drawings, the sealed container 30 has an exterior surface 31 which may be fabricated from a number of substances including wood, metal and synthetic materials, and combinations thereof. Still further, the sealed container 30 has an interior surface 32 which defines a cavity 33 which encloses containers, cargo, or contents of various types 34 within the cavity. As understood best by a study of FIGS. 2 and 3, the contents or contraband herein illustrated as a cylindrical or elongated rod 35 which could comprise, for example, a spent nuclear rod having a given density is concealed within a container 34 within the cavity 33. The sealed container 30 has a first side 36, and an opposite side 37.

Referring still to FIGS. 2 and 3, it will be seen that each inspection station 15 of the apparatus 10 includes a vertically oriented support which is generally indicated by the numeral 40. The vertically oriented support 40 includes a supporting frame 41. Each of the supporting frames 41 are individually supported on the opposite sides of the sealed container 30, and are mounted in a substantially vertical orientation relative to the top surface 24 of the base member 23. The respective supporting frames 41 each have a lower end 43 which is affixed by welding or the like to the base member 23, and an upper end 44. Mounted on the upper end of each of the supporting frames 41 is a bearing assembly 45. The bearing assembly 45 individually supports for rotatable motion a first chain sprocket 50 on the upper end 44; and a second lower chain sprocket 51 which is rotatably mounted on the lower end 43. A drive chain or member 52 is received about these respective first and second chain sprockets 50 and 51. Further, each of the supporting frames 41 mounts a movable support member 53 which is slideably borne by the respective supporting frames 41 and which is movable in a substantially vertical direction along a path of travel which is generally indicated by the numeral 54.

Referring still to FIGS. 2 and 3, it will be seen that the respective inspection stations 15 each mount a pair of electric motors 60, and which are designated hereinafter as a first electric motor, and a second electric motor 61 and 62, respectively. The first electric motor 61 is operable, when selectively energized, to cause rotation of the second chain sprocket 51, and thereby impart force by means of the drive chain 52 to cause the support member 53 to move along the path of travel 54 for the purposes which will be described in greater detail hereinafter. Still further, it should be understood that the first and second electric motors 61 and 62 are also individually electrically coupled to a motor drive 63 (FIG. 1) in a fashion so as to be selectively controlled by same. In the present arrangement, the second electric motor 62 of each inspection station 15 is drivingly coupled to at least one of the plurality of rail engaging wheels 26. When energized, the second electric motor 62 is operable to propel the base member 23 along the path of travel 27 and past the exterior surface 31 of the sealed container 30. As seen in FIG. 1, the motor drive 63 is electrically coupled to a controlling computer 64 which is operable to selectively energize the respective first and second electric motors 61, 62 for the purposes which will be discussed in greater detail below. The respective inspection stations 15, as well as the first and second electric motors 61 and 62, are electrically coupled to the controlling computer 64 by means of the motor drive 63, and by means of an electrical conduit 65 of conventional design.

The apparatus 10 for inspecting a sealed container 30 of the present invention includes a plurality of pulsed electron accelerators which are generally indicated by the numeral 70, and which are positioned in spaced relation relative to a first side 36 of a sealed container 30 and which produces a pulsed beam of photons 71 which passes through the sealed container 30 and any contents 34 and 35 enclosed within the sealed container 30. The pulsed beam of photons 71 has an energy of about 500 KeV to about 100 MeV. In one form of the invention, a prototype was developed which employed an electronic accelerator such as an electron LINAC or similar device. The pulsed beam of photons 71, which are often referred to as "bremsstrahlung radiation," is effective in penetrating the sealed container 30 and is received on the opposite side 37 of the sealed container 30 by a plurality of ionization detectors which are generally indicated by the numeral 80. The respective ionization detectors, as illustrated herein, are individual Geiger-Müller tubes, model number 71911 and which can be commercially secured from LND, Inc. Each of the respective ionization detectors 80 has a main body 81 which is coaxially received within an internal passageway as defined by a collimator 82. The collimator 82, and the respective ionization detectors 80 are oriented in a substantially parallel relation relative to the pulsed beam of photons 71 as provided by the plurality of pulsed electron accelerators 70. The respective collimators 82 may be formed of hollow metal pipes. For example, the metal may be selected from the group comprising iron, copper, lead, tungsten and aluminum. Other metals would work with an equal degree of success. The spacing between the respective collimators, and the respective plurality of pulsed electron accelerators 70 are in a range of about 1 inch to about 6 inches. As should be understood, the closer that the pulsed electron accelerators 70, and collimators 82 are positioned together, the better image resolution is achieved in a resulting visual image which will be discussed in greater detail hereinafter.

Figure 5:
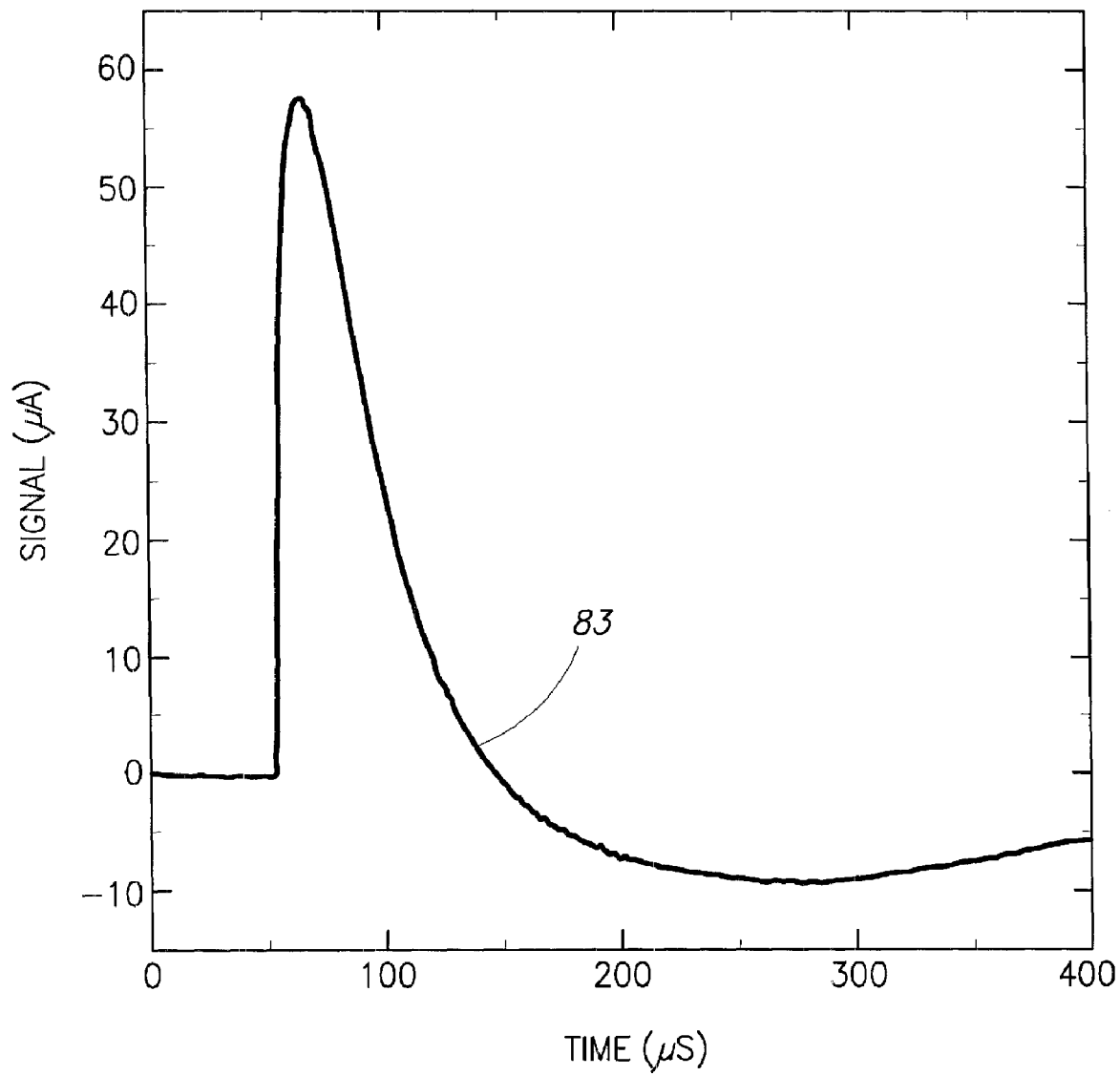
FIG. 5 is a signal response as provided for by one form of the present invention.

As seen in the drawings, the plurality of pulsed electron accelerators 70 as well as the plurality of ionization detectors 80 is each mounted in a given predetermined spaced pattern on the respective movable support members 53. As such, the respective pulsed electron accelerators 70, as well as ionization detectors 80 can be moved in unison, by the apparatus 10 along the respective paths of travel 54 so as to provide a resulting visual image, as will be discussed below, of the entire contents 34 of the sealed container 30. The respective ionization detectors 80 are operable to produce an output signal 83, as seen in FIG. 5, when exposed to the pulsed beam of photons 71 which are generated by the pulsed electron accelerators 70. This output signal 83 is provided to a preamplifier circuit which is generally indicated by the numeral 84 in FIG. 6, and which will be discussed below. The output of the preamplifier circuit 84 is subsequently transmitted over an electrical conduit such as a 50 Ohm double-shielded RG/223 coax cable to a data acquisition assembly which is generally indicated by the numeral 85 in FIG. 1. The data acquisition assembly could be, for example, a National Instruments PXI-6133 data acquisition board. In this regard, these data acquisition boards consist of eight channels which are simultaneously sampled at speeds up to 3 MS/s with 14-bit resolution. The data acquisition assembly 85 is controlled and read by a standard personal computer, here indicated by the numeral 64. The controlling computer 64 is operable to take the data provided by the data acquisition assembly 85, and generate a resulting visual image 86 as seen in FIG. 1, and which shows the contents 34 of the cavity 33 of the sealed container 30. With respect to the data acquisition assembly 85, a user of the present device or methodology can specify the number of photon pulses 71 to average; the translation rate of the sealed container 30; and a variety of image processing parameters.

In the arrangement as seen in the drawings, the sealed container 30 either passes by the respective inspection stations 15; or further the respective inspection stations 15 are moved, in unison, along the path of travel 27, and past the stationary sealed container 30. Regardless of the form of the invention, a number of photon pulses 71 are averaged together from each ionization detector 80 to create a line scan of the sealed container 30 representing a few inches in the horizontal direction. In both forms of the invention, as described above, the movable support members 53 would be selectively moved along the path of travel 54 so as to form each succeeding line scan until an image 86 is formed of the entire container. In one form of the invention, each line scan consists of 16 pixels where each pixel represents the average signal from a single detector. As the sealed container 30 moves across and between the inspection stations 15, or further the respective inspection stations 15 are moved, in unison, relative to the stationary sealed container 30, the pulsed electron accelerators 70 are selectively energized, and the subsequent line scans are created and brought together to form a two-dimensional visible image 86 as seen in FIG. 1.

Figure 4:
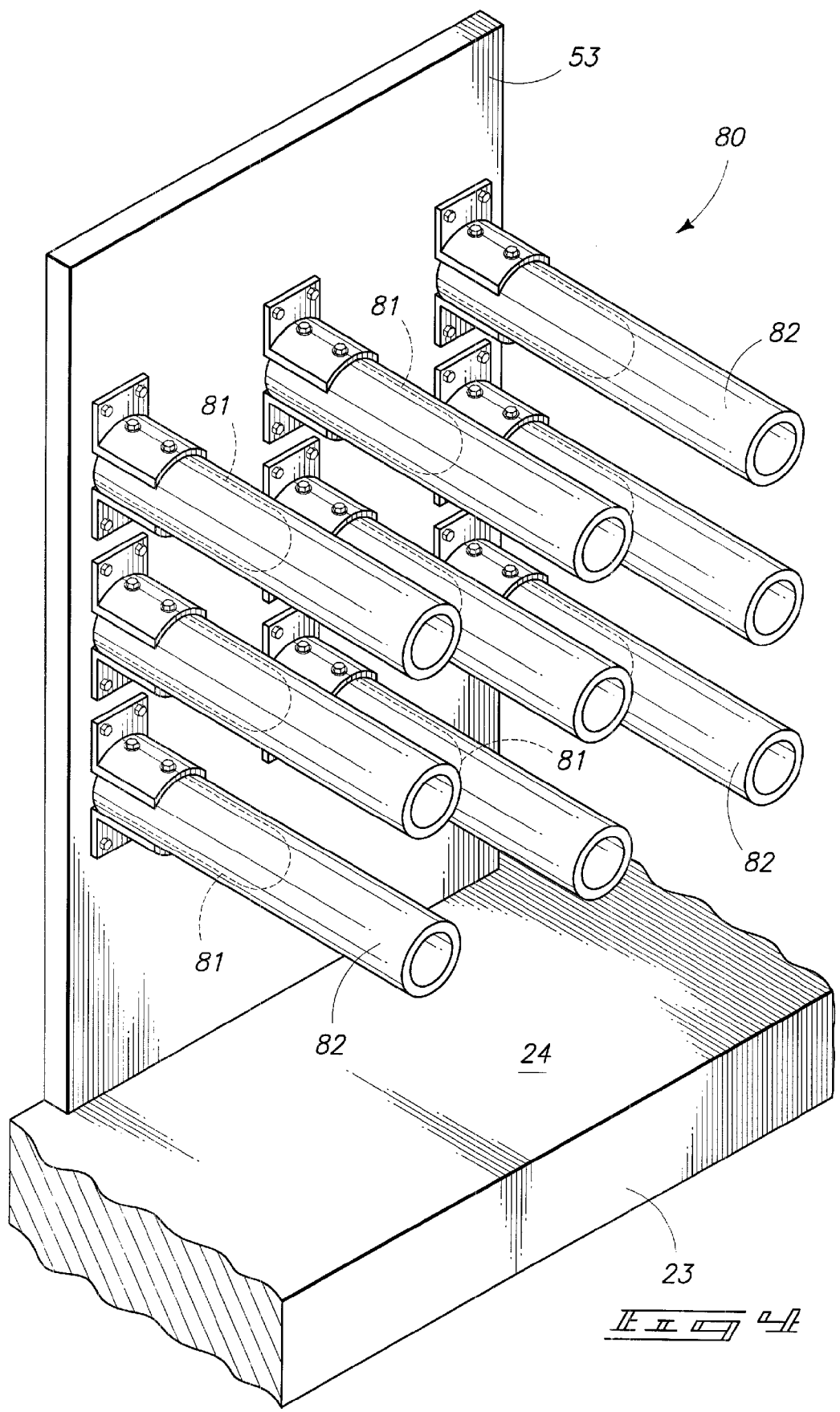
FIG. 4 is a fragmentary, perspective, side elevational view of a plurality of detectors which are useful in the practice of the present invention.

In the arrangement as seen in the present invention, the plurality of ionization detectors 80 may consist of Geiger-Müller tubes, as discussed above. These ionization detectors, as purchased, are approximately ten inches long, and have a diameter of approximately 0.62 inch. Still further, as seen in the arrangement of FIG. 4, each of the ionization detectors 80 were collimated by at least a one inch outside diameter iron pipe which had a wall thickness of about 0.15 inch. As noted earlier, the ionization detectors 80 were oriented parallel with the pulsed beam of photons 71 and were separated or spaced at approximately two inch intervals, one from another. In the present invention, and as discussed earlier, the apparatus 10 includes a plurality of pulsed electron accelerators 70. Further, the plurality of pulsed electron accelerators 70 are selectively individually energized sequentially by the computer 64 to form the visible image 86 as seen in FIG. 1. In the arrangement as seen in FIG. 1, the computer 64, by means of the motor controller 63, is further operable to move the respective plurality of pulsed electron accelerators 70, and ionization detectors 80, in unison, along the vertically oriented path of travel 54, and further move the respective inspection stations 15, in unison, along the path of travel 27 so that they remain in substantial alignment, one relative to the other. As earlier discussed, the present method for inspecting a sealed container 30 may include steps whereby the inspection stations 15 are uniformly moved along paths of travel 27 along the sealed container 30; or further the inspection stations 15 may remain stationary along the path of travel 27, and the sealed container 30 is moved along the path of travel 14 by the stationary inspection stations 15 so as to enable the apparatus 10 to form a visible image 86 as seen in FIG. 1. As should be understood, the respective inspection stations 15 would still move, in unison, in the vertical direction to form the visible image 86.

Referring now to FIG. 5, it will be seen that during each of the pulsed beams of photons 71 the individual ionization detectors 80 produces an output signal 83 which is somewhat similar to that shown in FIG. 5. The total charge collected by the respective ionization detectors 80, which is determined by integrating the current signal, is proportional to the intensity of the pulsed beam of photons 71. As should be understood, as higher density material that might be concealed within the sealed container 30 passes in front of the ionization detectors 80, the charge collected decreases, indicating the absorption of the photons 71 by the high density material. The collimator 82 which may, for example, include an iron pipe, and which surrounds each of the ionization detectors 80, enhances the overall signal-to-noise-performance of the apparatus 10 and methodology. In the present invention, and before sending the output signal 83 of the respective ionization detectors 80 to the data acquisition assembly 85, and as noted earlier, the output signals 83 are passed through a high-to-low impedance preamplifier circuit 84 as illustrated in FIG. 6. The preamplifier circuit 84, as shown in this drawing, has a high impedance input to the respective ionization detectors 80, and further produces an output signal 83 for transmission to the data acquisition assembly 85 over low impedance transmission lines. In addition to the foregoing, this preamplifier circuit 84 can amplify the output signal 83 by a factor of less than about 1,000.

As seen in FIG. 6, the preamplifier circuit 84 is designed to operate in a proportional mode. Broadly speaking, the preamplifier circuit 84 receives a high impedance output signal input 90 from the respective plurality of ionization detectors 80, and provides a preamplifier signal output 91 having a low impedance for transmission to the data acquisition assembly 85 as earlier described. In this regard, the preamplifier circuit 84 has first, second, third, and fourth capacitors 92-95, respectively. Each of these respective capacitors 92-95 has a value of 0.01 µF. Still further, the preamplifier circuit 84 has a pair of voltage sources 100 which are designated as first and second voltage sources 101 and 102, respectively. Each of these voltage sources 101, 102 supplies approximately 12 volts to the preamplifier circuit 84. Still further, the preamplifier circuit 84 includes an output amplifier 103 which is electrically coupled with first, second, and third resistors 104, 105, and 106, respectively. These resistors have electrical values of 1 k, 11 k, and 1.2M respectively. The components, noted in this paragraph are electrically coupled together by an electrical pathway 110. The preamplifier circuit 84 is grounded 111 as indicated in FIG. 6.

Operation

The operation of the described embodiments of the present invention are believed to be readily apparent and is briefly summarized at this point.

Broadly speaking, the present invention relates to an apparatus and method for inspecting a sealed container 30 which includes a pulsed electron accelerator 70 which is positioned in spaced relation relative to a first side 36 of the sealed container 30, and which produces a pulsed beam of photons 71 which passes through the sealed container 30 and any contents 34 within the sealed container. Further, the apparatus 10 for inspecting the sealed container 30 includes a detector 80 which is positioned in spaced relation relative to a second, opposite side 37 of the sealed container 30, and which receives the pulsed beam of photons 71 which passes through the contents 34 of the sealed container 30, and which produces an output signal 83. Still further, the apparatus 10 of the present invention includes a computer 64 for developing a visible image 86 from the output signal 83 of the detector 80, and which depicts the contents 34 of the sealed container 30. In the arrangement as seen in FIGS. 1 through 3, the pulsed beam of photons 71 has an energy of about 500 KeV to about 100 MeV. Further, and as earlier disclosed, the detector 80 may comprise an array of detectors 80 which are disposed in a predetermined spaced pattern as seen in FIG. 4. Still further, the pulsed electron accelerator 70 may comprise an array of pulsed electron accelerators as seen in FIGS. 2 and 3. In the arrangement as seen in the drawings, a collimator 82 is operably borne by or associated with each of the detectors 80. The respective collimators receive and direct, at least in part, the pulsed beam of photons 71 to the respective detectors 80. As seen in FIGS. 2 and 3, an assembly, such as an inspection station 15 individually mounts the pulsed electron accelerators 70, and the detectors 80, and further moves each of the pulsed electron accelerators 70, and the detectors 80, in unison, along paths of travel 27 and 54, and past the sealed container 30 to facilitate the formation of a visible image 86 of substantially all the contents 34 of the sealed container 30. Still further, in an alternative form of the invention, roller assemblies 12 and 13 are provided for transporting the sealed container 30 along a predetermined path of travel 14 and past the pulsed electron accelerators 70 and the detectors 80. As previously discussed, the movement of the sealed container 30 along the path of travel 14 facilitates the formation of a visible image 86 of substantially all the contents of the sealed container 30. The movement of the sealed container 30 along the path of travel can be effected by means of a chain drive or other propulsion means, not shown, which moves the sealed container 30 along the path of travel and past the inspection stations 15.

In the present invention, the detector 80 comprises an ionization detector, such as a Geiger-Müller tube, which produces an output signal 83 which is proportional to the intensity of the pulsed beam of photons 71. As presently disclosed, the pulsed beam of photons 71 is characterized as a bremsstrahlung radiation pulse, and wherein the contents 34 of the sealed container 30 may have a density which absorbs and/or reduces the intensity of the bremsstrahlung radiation pulse which is received by the respective ionization detectors 80. This is most clearly illustrated by reference to FIG. 5. Yet further, the apparatus 10 of the present invention further includes a preamplifier circuit 84 which is electrically coupled to the output signal 83 produced by the respective ionization detectors 80, and the computer 64 for developing a visible image 86. As illustrated, the means for developing the image 86 which is depicted herein as a computer is also controllably coupled to the motor controller 63, and the pulsed electron accelerators 70. The computer 64 is operable to controllably pulse as well as move, in unison, the inspection stations 15, electron accelerators 70, and ionization detectors 80 by means of the electric motors 61 and 62 by utilizing signals sent to the motor controller 63.

As seen in FIG. 6, and as discussed earlier, the preamplifier circuit 84 converts the output signals 83 so that they may be transmitted over a low impedance line to the computer 64 of developing the visible image 86. As earlier discussed, the preamplifier circuit 84 amplifies the output signal 83 by less than a factor of about 1,000. In the present invention, the computer 64 for developing the visible image 86 further comprises a data acquisition assembly 85 (FIG. 1) which is coupled in output signal receiving relation relative to the output signal 91 provided by the preamplifier circuit 84 and which further produces a resulting data output which is derived from the respective output signals 83 which are produced by the plurality of ionization detectors 80. Still further, the computer 64 receives and processes the data output to generate the visible image 86 of the sealed container 30. In the present arrangement, the apparatus 10 as discussed, and as seen in the drawings, includes a plurality of ionization detectors 80, in an array, and wherein the computer 64 generates the visible image 86 from a plurality of line scans which are formed of individual pixels. In this arrangement, the computer 64 averages the data output of each of the ionization detectors 80 to produce the respective pixels which are incorporated into a single line scan. As earlier discussed, the respective line scans are joined together to form the resulting image 86.

The present invention also relates to a method 10 for inspecting a sealed container 30 and which includes the steps of providing a sealed container 30 which has opposite sides, and which has contents 34 which requires inspection; and providing an electron accelerator 70 which, when energized, produces a beam of bremsstrahlung radiation, pulsed beam of photons 71, and positioning the electron accelerator 70, in spaced relation relative to one of the sides 36 of the sealed container 30, and in an orientation which permits the beam of bremsstrahlung radiation 71 to pass through the sealed container 30, and the contents 34 enclosed within same. The present method 10 further includes the steps of providing ionization detector 80 of bremsstrahlung radiation 71, and positioning the ionization detector 80 in spaced relation relative to an opposite side 37 of the sealed container 30, and in an orientation so as to receive the beam of bremsstrahlung radiation 71 which passes through the sealed container 30, and the contents 34 thereof, and wherein the ionization detector 80 produces an output signal 83 which is proportional to the intensity of the beam of bremsstrahlung radiation 71 which is received. Still further, the present method includes the step of periodically energizing the electron accelerator 70 to provide a pulsed beam of bremsstrahlung radiation 71 which passes through the sealed container 30, and the contents 34 thereof, and wherein the beam of bremsstrahlung radiation is absorbed, at least in part, by the contents 34 of the sealed container 30. The method further includes another step of converting the output signal 83 of the detector 80 into a stream of data 91 which reflects the intensity of the beam of bremsstrahlung radiation 71 which is received by the detector; and producing a visible image 86 of the contents 34 of the sealed container 30 from the data stream. In the present methodology, the method further includes the step of moving the sealed container 30 along a path of travel 14 past the electron accelerator 70, and the ionization detector 80 while the electron accelerator 70 is energized.

Still further and as earlier discussed, the present method 10 may include an alternative step of moving the electron accelerator 70, and the ionization detector 80, in unison, and along a path of travel 27 past the sealed container 30, as the electron accelerator 70 is periodically energized. The present method further includes the step of increasing the signal-to-noise ratio of the ionization detector 80. This is achieved in present invention by providing collimators 82, and spacing the collimators at predetermined distances. In the present methodology, the step of producing a visible image 86 of the contents 34 of the sealed container 30 further includes the step of providing a computer or data processor 64 which receives the data stream and which produces the visible image 86. In the present methodology, the computer 64 further comprises a data acquisition assembly 85 which receives the output signal 83 of the ionization detector 80, and which produces the data steam; and a computer or other data processor 64 which receives, and converts the data steam into individual pixels which are joined together to form the visible image 86. As earlier disclosed, the computer or data processor 64 periodically energizes the electron accelerator 70. When the invention includes a plurality of electron accelerators 70, the computer or data processor 64 is operable to selectively individually energize the respective electron accelerators 70 in a sequential mode.

Therefore it will be seen that the present invention provides a new and novel means for rapidly inspecting large volumes of cargo and which further is inexpensive and provides low-resolution imaging detection which is effective in identifying concealed high density material, such as spent nuclear material, and the like, which might be used for unlawful purposes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An apparatus for inspecting a sealed container, comprising:

a first roller assembly and a second roller assembly spaced from the first roller assembly for moving the sealed container along a path thereon during inspection;

a first rail assembly mounted adjacent to the first roller assembly and a second rail assembly mounted adjacent the second roller assembly;

a pulsed electron accelerator configured for positioning in spaced relation relative to a first side of a sealed container and the contents therein, the pulsed electron accelerator configured for producing a pulsed beam of photons for passing through the sealed container and any contents enclosed within the sealed container, the pulsed electron accelerator vertically movable and horizontally movable with respect to the sealed container, the pulsed electron accelerator being mounted on the first rail assembly and being independently movable with respect to the first rail assembly;

a collimated detector including a collimator having the detector coaxially located therein which is operably borne by the collimated detector for receiving and directing a portion of the pulsed beam of photons to the collimated detector, the collimated detector configured for positioning in spaced relation relative to a second, opposite side of the sealed container, the collimate detector configured for receiving the pulsed beam of photons, the pulsed beam of photons oriented substantially parallel with the collimated detector, the pulsed beam of photons for passing through the contents of the sealed container, the collimated detector configured for producing an output signal, the collimated detector vertically movable and horizontally movable, the collimated detector being mounted on the second rail assembly and being independently movable with respect to the pulsed electron accelerator mounted on the first rail assembly; and apparatus for developing a visible image from the output signal of the collimated detector for depicting the contents of the sealed container.

2. The apparatus of claim 1, wherein the pulsed beam of photons has an energy of about 2 MeV to about 100 MeV.

3. The apparatus of claim 1, wherein the collimated detector comprises an array of detectors which are disposed in a predetermined spaced pattern.

4. The apparatus of claim 1, wherein the collimated detector comprises an array of detectors, and the pulsed electron accelerator comprises an array of pulsed electron accelerators.

5. The apparatus of claim 1, wherein the collimator comprises a pipe coaxially receiving the body of the detector within an internal passageway of the collimator and extending beyond the body of the detector.

6. The apparatus of claim 1, further comprising:

an assembly for transporting the sealed container along a predetermined path of travel, and by the pulsed electron accelerator and the collimated detector, the movement of the sealed container along the path of travel for facilitating the formation of a visible image of substantially all the contents of the sealed container.

7. The apparatus of claim 1, further comprising:

an assembly mounted on the pulsed electron accelerator, and the collimated detector for moving each of the pulsed electron accelerator and the collimated detector in unison along a path of travel past the sealed container for facilitating the formation of a visible image of substantially all the contents of the sealed container.

8. The apparatus of claim 1, wherein the collimated detector comprises an ionization detector for producing an output signal which is proportional to an intensity of the pulsed beam of photons which is received.

9. The apparatus of claim 8, wherein the ionization detector is a Geiger-Müller tube.

10. The apparatus of claim 8, wherein the pulsed beam of photons comprises a bremsstrahlung pulse, and wherein the contents of the sealed container has a density which absorbs and reduces the intensity of the bremsstrahlung pulse which is received by the ionization detector.

11. The apparatus of claim 8, further comprising a preamplifier which is electrically coupled to the output signal produced by the ionization detector and the apparatus for developing the visible image.

12. The apparatus of 11, wherein the preamplifier converts the output signal so that it may be transmitted over a low impedance line to the apparatus for developing the visible image.

13. The apparatus of claim 12, wherein the preamplifier amplifies the output signal by less than about a factor of 1000.

14. The apparatus of claim 1, wherein the apparatus for developing a visible image further comprises:
    a data acquisition assembly coupled in output signal receiving relation relative to the output signal, the data acquisition assembly for producing a resulting data output which is derived from the output signal which is produced by the collimated detector; and
    a computer for receiving and processing the data output for generating the visible image of the sealed container.

15. The apparatus of claim 14, wherein the collimated detector comprises a plurality of collimated detectors in an array, and wherein the computer generates the visible image from a plurality of line scans which are formed of individual pixels, the computer averaging the data output of each of the collimated detectors of the array for producing the respective pixels which are incorporated into a single line scan.

16. The apparatus of claim 14, wherein the collimated detector comprises an array of detectors, and wherein the pulsed electron accelerator comprises an array of pulsed electron accelerators, the pulsed electron accelerators for individual sequential activation for each to produce a pulsed beam of photons.

17. An apparatus for inspecting a sealed container, comprising:
    a first roller assembly and a second roller assembly spaced from the first roller assembly for moving the sealed container along a path thereon during inspection;
    a first rail assembly mounted adjacent to first roller assembly and a second rail assembly mounted adjacent the second roller assembly;
    a pulsed electron accelerator for positioning in spaced relation relative to one side of a sealed container for inspecting the contents therein, the pulsed electron accelerator for producing a beam of pulsed bremsstrahlung radiation having an intensity for passing through the sealed container for a portion thereof for being absorbed by the contents of the sealed container, the pulsed electron accelerator vertically movable and horizontally movable with respect to the sealed container, the pulsed electron accelerator being mounted on the first rail assembly and movable;
    an array of ionization detectors for inspecting a sealed container, the array of ionization detectors configured for positioning in spaced relation relative to an opposite side of the sealed container for substantially receiving the beam of pulsed bremsstrahlung radiation, each of the ionization detectors for producing an output signal which is proportional to the intensity of the pulsed beam of bremsstrahlung radiation which has passed through the sealed container and which is received by the array of ionization detectors, the array of ionization detectors vertically movable and horizontally movable for detecting the beam of pulsed bremsstrahlung radiation from the sealed container, the array of ionization detectors mounted on the second rail assembly independently movable with respect to the pulsed electron accelerator mounted on the first rail assembly;
    a collimator mounted on each of the ionization detectors having the ionization detector coaxially located therein for collimating a portion of the beam of pulsed bremsstrahlung radiation which has passed through the sealed container, and which is received by the array of ionization detectors, the beam of pulsed bremsstrahlung radiation oriented substantially parallel with the ionization detectors;
    a data acquisition assembly for receiving respective proportional output signals generated by the array of ionization detectors which are positioned in the array, the data acquisition assembly for generating a data output regarding the intensity of the beam of pulsed bremsstrahlung radiation which has been received by the array of ionization detectors; and
    a computer for controlling the pulsed electron accelerator and for selectively energizing the pulsed electron accelerator for producing the beam of pulsed bremsstrahlung radiation, and for receiving the data output of the data acquisition assembly for producing a visible image of the contents of the sealed container.

18. The apparatus of claim 17, further comprising:
    an assembly for moving, in unison, the pulsed electron accelerator and the array of ionization detectors past the sealed container so as to form a resulting visible image of the entire contents of the sealed container.

19. The apparatus of claim 17, wherein the pulsed electron accelerator comprises an array of pulsed electron accelerators, each pulsed electron accelerator individually sequentially energized by the computer.

20. The apparatus of claim 17, further comprising:
    an assembly for moving the sealed container past the pulsed electron accelerator and the array of ionization detectors for forming a resulting visible image of the entire contents of the sealed container.

21. The apparatus of claim 17, further comprising:
    a preamplifier for receiving and modifying the output signal provided by the array of ionization detectors prior to delivering the respective output signals to the data acquisition assembly.

22. The apparatus of claim 21, wherein the preamplifier comprises a high-to-low impedance preamplifier for converting the respective output signals for transmitting the output signals over a low impedance line to the data acquisition assembly.

23. The apparatus of claim 17, wherein each collimator defining a passageway having the ionization detector coaxially located therein extending along the body of the ionization detector, and wherein each ionization detector of the array of ionization detectors is positioned for substantially receiving the beam of pulsed bremsstrahlung radiation within each passageway.

24. The apparatus of claim 23, wherein the respective collimators and associated array of ionization detectors are located in spaced relation one relative to the others, and wherein the spacing of the collimators is selected for producing a desired visible image resolution.

25. The apparatus of claim 24, wherein each collimator comprises a collimator fabricated from a material for increasing the signal-to-noise ratio performance of each of the associated ionization detectors for receiving the beam of pulsed bremsstrahlung radiation in the passageway thereof.

26. The apparatus of claim 25, wherein the material is selected from the group comprising iron, copper, lead, tungsten and aluminum.

27. The apparatus of claim 25, wherein the spacing of the respective collimators is in a range of about 1 inch to about 6 inches.

28. The apparatus of claim 17, wherein the computer processes the data output provided by the data acquisition assembly for generating individual pixels for forming the visible image for depicting the contents of the sealed container.

29. A method for inspecting a sealed container, comprising:
  providing a first roller assembly for moving the sealed container along a path thereon during inspection;
  providing a second roller assembly spaced from the first roller assembly for moving the sealed container along a path thereon during inspection;
  providing a first rail assembly mounted adjacent to first roller assembly;
  providing a second rail assembly mounted adjacent the second roller assembly;
  providing a sealed container having opposite sides and contents requiring inspection;
  providing an electron accelerator for producing a beam of bremsstrahlung radiation, the electron accelerator vertically movable and horizontally movable with respect to the sealed container;
  positioning the electron accelerator in spaced relation relative to one of the sides of the sealed container in an orientation for permitting the beam of bremsstrahlung radiation to pass through the sealed container, and the contents enclosed within the sealed container, the electron accelerator mounted on the first rail assembly being independently movable thereon;
  providing a collimated detector for detecting the beam of bremsstrahlung radiation, the collimated detector vertically movable and horizontally movable for detecting the pulsed beam of photons from a sealed container, the collimated detector mounted on the second rail assembly independently movable with respect to the electron accelerator mounted on the first rail assembly, the collimated detector including a collimator having the detector coaxially located therein;
  positioning the collimated detector in spaced relation relative to an opposite side of the sealed container in an orientation for receiving the beam of bremsstrahlung radiation which passes through the sealed container, and the contents thereof, the beam of bremsstrahlung radiation oriented substantially parallel with the collimator detector, the collimated detector for producing an output signal which is proportional to the intensity of the beam of bremsstrahlung radiation which is received;
  periodically energizing the electron accelerator to provide a pulsed beam of bremsstrahlung radiation for passing through the sealed container and the contents thereof, the beam of bremsstrahlung radiation for being partially absorbed by the contents of the sealed container;
  moving the electron accelerator vertically and horizontally;
  moving the collimated detector vertically and horizontally;
  converting the output signal of the collimated detector into a stream of data for reflecting the intensity of the beam of bremsstrahlung radiation which is received by the collimated detector; and
  producing a visible image of the contents of the sealed container from the data stream.

30. The method of claim 29, further comprising:
  moving the sealed container along a path of travel past the electron accelerator and the collimated detector while the electron accelerator is periodically energized.

31. The method of claim 29, further comprising:
  moving the electron accelerator and the collimated detector, in unison, past the sealed container as the electron accelerator is periodically energized.

32. The method of claim 29, further comprising:
  increasing the signal-to-noise ratio of the collimated detector.

33. The method of claim 32, wherein increasing the signal-to-noise ratio further comprises:
  providing a collimator comprising a pipe for enclosing the body of the detector in the collimated detector.

34. The method of claim 29, wherein producing a visible image of the contents of the sealed container further comprises providing a data processor for receiving the data stream for producing the visible image.

35. The method of claim 34, wherein the data processor further comprises:
  a data acquisition assembly for receiving the output signal of the collimated detector, and for producing the data steam; and
  a computer coupled with the data acquisition assembly and for receiving and converting the data steam into individual pixels for forming the visible image.

36. The method of claim 35, wherein the computer periodically energizes the electron accelerator.

37. The method of claim 36, further comprising:
  moving the electron accelerator and the collimated detector in unison past the sealed container, and/or the sealed container past a substantially stationary electron accelerator and collimated detector while the electron accelerator is periodically energized; and
  controlling the movement of the electron accelerator and the collimated detector; and/or the movement of the sealed container; and the periodic energizing of the electron accelerator with the computer.

* * * * *